United States Patent [19]

Jacobs

[11] Patent Number: 5,386,510
[45] Date of Patent: Jan. 31, 1995

[54] METHOD OF AND APPARATUS FOR CONVERTING OUTLINE DATA TO RASTER DATA

[75] Inventor: Robertus E. Jacobs, Domburg, Netherlands

[73] Assignee: Oce-Nederland BV, Venlo, Netherlands

[21] Appl. No.: 863,524

[22] Filed: Apr. 3, 1992

Related U.S. Application Data

[63] Continuation of Ser. No. 342,988, Apr. 24, 1989, abandoned.

[30] Foreign Application Priority Data

Apr. 29, 1988 [NL] Netherlands .......................... 8801116

[51] Int. Cl.$^6$ ............................................. G06F 15/62
[52] U.S. Cl. ..................... 395/163; 395/162; 395/143; 395/100
[58] Field of Search .................. 364/DIG. 1, DIG. 2; 340/723–727; 395/100, 140–143, 162, 163; 345/121–126

[56] References Cited

U.S. PATENT DOCUMENTS

| | | | |
|---|---|---|---|
| 4,564,901 | 1/1986 | Tomlinson et al. | ... 364/200 MS File |
| 4,614,941 | 9/1986 | Jarvis | ............................ 340/723 X |
| 5,113,523 | 5/1992 | Colley et al. | ................. 364/DIG. 2 |

*Primary Examiner*—Almis Jankus
*Attorney, Agent, or Firm*—Reed Smith Shaw & McClay

[57] ABSTRACT

In an apparatus comprising a central unit and a number of parallel processors (transputers) each provided with a part of page-size bitmap memory, a method to execute rasterization orders on an arbitrary non-busy processor, and subsequently transmit the result thereof, a draw order, via a communication channel that connects all the processors to the unit, to the processor where the draw order has to be executed.

5 Claims, 5 Drawing Sheets

METHOD OF AND APPARATUS FOR CONVERTING OUTLINE DATA TO RASTER DATA

This is a continuation of copending application Ser. No. 07/342,988 filed on Apr. 24, 1989 now abandoned.

FIELD OF THE INVENTION

The invention relates to a raster image processor and processes for converting image data into raster data utilizing parallel processors, and in particular to apparatus and processes which provide full distribution of image data to said processors.

BACKGROUND OF THE INVENTION

Methods for converting data which comprise the outlines of image parts ("objects") to raster data are known. The raster is built up from a number of scan lines which can be divided into parts and stored in an apparatus make up of a central unit with at least two parallel processors, each provided with a local bitmap memory subdivided for raster memory lines in which the corresponding scan lines can be stored. An example of a multiprocessor system is disclosed in French Patent Application No. 2,561,009. In another system, a communication channel interconnects a central unit and the processors.

An apparatus of this latter type forms part of a raster image processor as used in printers and visual display units to which data are fed from a processing station concerning the characters or figures (objects) to be printed, in the form of outline descriptions, such as vector descriptions. The printer (e.g., a laser printer) is adapted to deflect a modulated beam of light line by line over a light-sensitive surface. By advancing the light-sensitive surface perpendicularly to the direction of deflection it is possible to expose a complete page imagewise and print it on a receiving sheet by a known method. The outline descriptions must therefore first be converted to raster data.

The raster data are stored in a page-size bitmap memory. The position of each image point on the light-sensitive surface corresponds to the position of a memory element in the memory where the information of that image point is stored. To be able to embody a high-speed printer it is necessary to use a high-speed raster image processor. One example of such a raster image processor is described in WO 87/02159.

This raster image processor is based on a parallel architecture. Each image processor processes a permanently allocated part (local memory) of this bitmap memory. The conversion of an object is effected on the basis of this local memory permanently allocated to each subprocessor. In such a processor, each subprocessor receives only that part of the object which is associated with the local bitmap memory belonging to that subprocessor.

The computing task required to fill that local bitmap memory is effected by the subprocessor physically connected to that local bitmap memory.

In the conversion of an object in a multiprocessor system, it is possible to distinguish three activities:
(a) transmission of information about the object to the processors,
(b) calculation of the raster memory lines to be filled in the local memories, and
(c) filling of the raster memory lines with a pattern of bits corresponding to that part of the object which was intended for that part of the bitmap memory.

Steps (b) and (c) are performed by the same subprocessor only if the filling of the bitmap memory must be effected via that processor. Accordingly, irrespective of how the raster memory lines of the bitmap memory are distributed over the available subprocessors, there are objects which have a shape such that not every subprocessor is equally involved in the raster conversion of that object. This results in inefficient processor use because there are, on average, a number of processors that are motive inactive.

The object of the invention is to achieve more efficient processor use.

SUMMARY OF THE INVENTION

The present invention provides a method and apparatus in which, at least for part of the object, a rasterization order is generated in a central unit. Preferably, the central unit comprises a microcomputer. The transmission of the rasterization order is over the communication channel for execution by a first parallel processor which is not busy at that time. At least one corresponding draw order is generated which also contains data concerning the position in the bitmap memory where the result of this draw order is to be stored. The draw order is transmitted over the communication channel for execution in a second parallel processor, the local bitmap memory of which is filled with raster data concerning at least the one part of the object.

With regard to the apparatus, each parallel processor is provided with a communication unit which, depending upon the busy state of the arithmetic logic unit, transmits a rasterization order to a following parallel processor via the communication channel. As a result, a page which is being fed and which consists of outline descriptions can be converted and written into the bitmap memory more rapidly, thus increasing the printing speed.

These and other advantages will be explained with reference to presently preferred embodiments taken with reference to the drawings.

PRESENTLY PREFERRED EMBODIMENT

Figure 1:
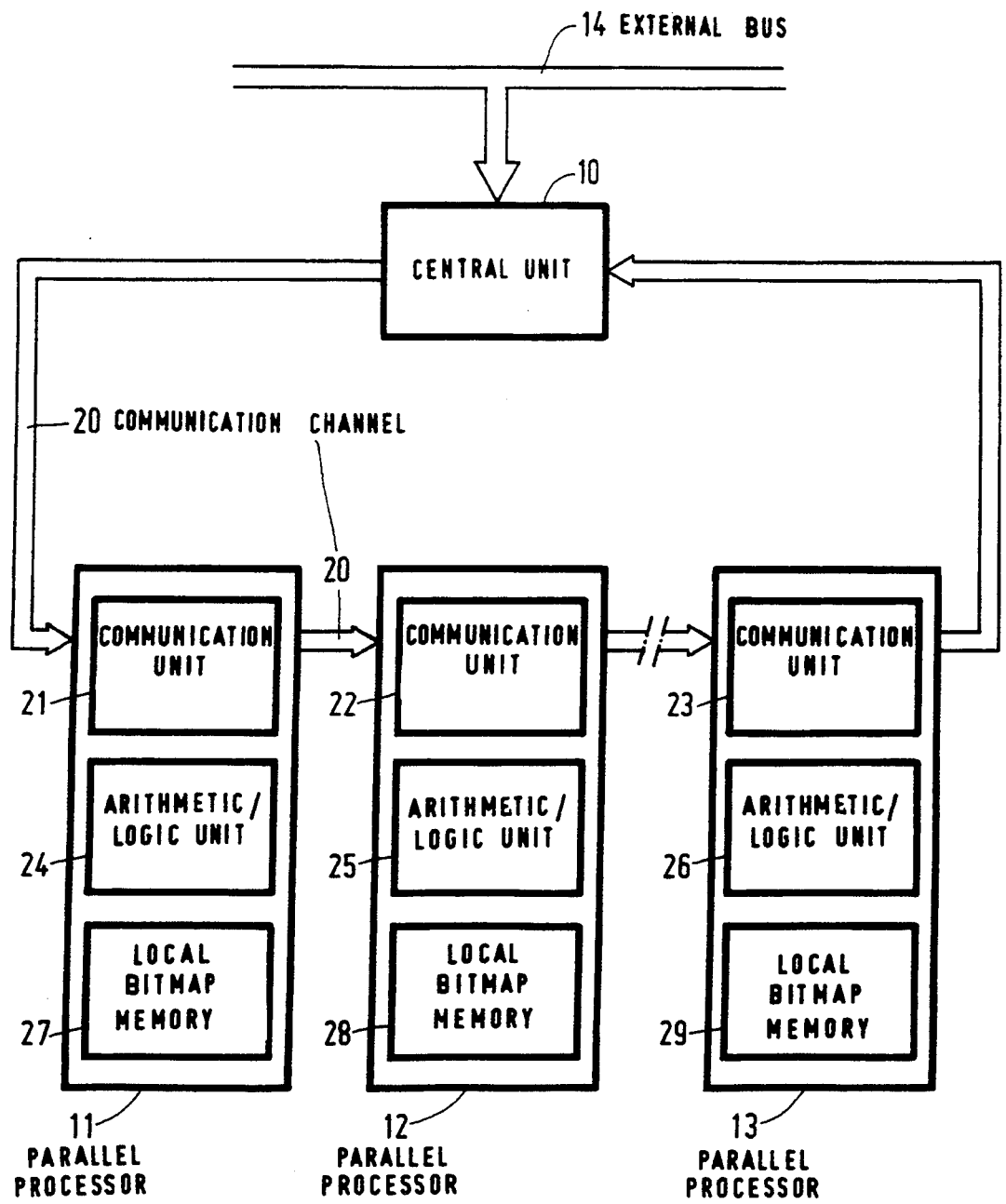
FIG. 1 is a diagram of apparatus of the present invention for converting data of the outlines of image parts into raster data.

FIG. 1 is a diagram of apparatus for converting data concerning the outlines of image parts (objects) in to raster data (scan lines). A central unit 10 is connected by external bus 14 to a processing station, such as a word-processor, a main-frame computer, a personal computer or the like. At the processing station, pages to be printed are generated and temporarily stored in files in a memory. The description of such a page is generated in code form. For characters and figures on that page, the outlines in the form of vectors together with the position on the page are stored. A widely used page description language which can be used is "PostScript®" from Adobe.

The files containing the information of a whole page to be printed are downloaded via external bus 14 to central unit 10. Central unit 10 comprises a microcomputer with a memory for storage of the downloaded page-files and is connected to a number of parallel processors 11, 12 and 13 via a communication channel 20. Each parallel processor comprises a communication unit 21, 22 and 23, an arithmetic logic unit 24, 25 and 26 and a local bitmap memory 27, 28 and 29, respectively.

Each local bitmap memory 27, 28 and 29 contains part of a page-size bitmap memory in which image data concerning a full page can be stored. Each image of a page of a size of about 20×30 cm thus contains 4000×6000 image points or pixels (20 pixels/mm). These pixels are arranged in 4000 scan lines each 6000 pixels long. With n local bitmap memories, each local bitmap memory contains image data concerning 4000/n scan lines. With 8 local bitmap memories and hence 8 parallel processors, each local bitmap memory will contain image data of five-hundred scan lines.

Figure 2:
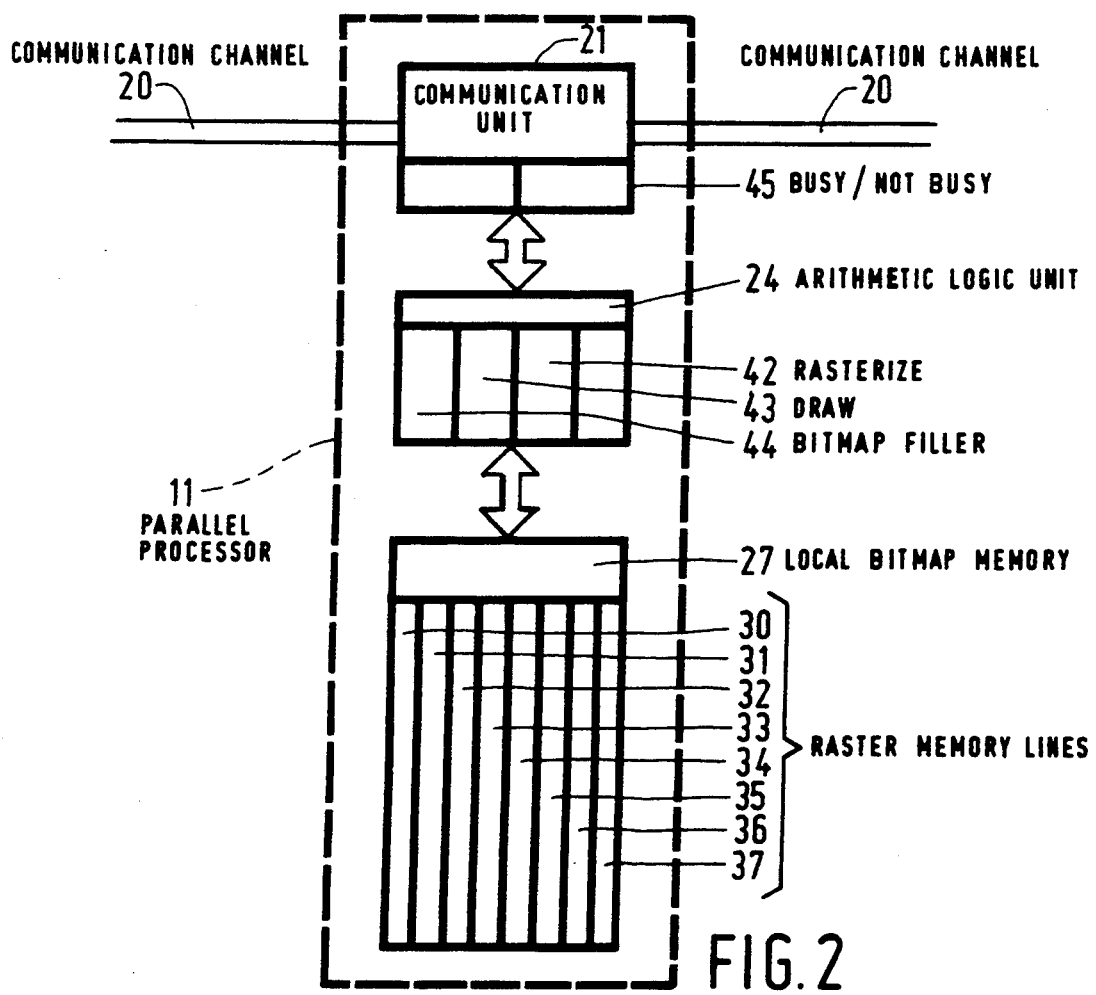
FIG. 2 is a diagram of a parallel processor.

FIG. 2 diagrammatically illustrates a parallel processor 11 for use in the present invention. Parallel processor 11 comprises a communication unit 21 connected to communication channel 20 and to arithmetic logic unit 24. The arithmetic logic unit 24 is connected to a local bitmap memory 27. The bitmap memory is subdivided into a number of raster memory lines 30–37 each of which can contain the image data concerning one scan line. Thus, raster memory line 30 contains, for example, image data of the first scan line, raster memory line 31 contains image data of the second scan line, and so on. Local bitmap memory 27 can contain, for example, image data in respect of the first 8 scan lines of a page. Second parallel processor (similar to processor 11) is provided with a second local bitmap memory which can contain the image data of the next 8 scan lines of a page, and so on.

If a rasterization order is fed via communication channel 20 to first parallel processor 11 and to communication unit 21, while arithmetic logic unit 24 is inoperative, the rasterization order is fed to unit 24, where it is executed. (Indicated diagrammatically by block 42). The result of this rasterization order is that at least one draw order is generated. This draw order also contains data concerning the location that the image part to be generated is to occupy in the bitmap memory. As an example, a rasterization order is selected in which an object must be placed in raster memory lines equivalent to scan lines 17–23. These draw orders are then transmitted via communication channel 20. Each communication unit of each parallel processor contains comparison means 45 which compare the location data in the draw order with the location data of the raster memory lines belonging to that parallel processor. In the case of agreement (in the example selected this will be the case with the third parallel processor), this draw order is fed to the associated arithmetic logic unit. In the absence of such agreement, the draw order will be passed to the next parallel processor.

The draw order is then executed in the arithmetic logic unit (indicated diagrammatically by block 43) and transmitted to the bitmap filler (indicated diagrammatically by block 44) which places the image data in the correct positions in the raster memory lines of local bitmap memory 27.

The arithmetic logic unit 24 also contains means with which the busy state of the unit can be determined and communicated to the communication unit 21 and, via the latter, to central unit 10. If, in the case of a new rasterization order fed via the communication channel 20, the first parallel processor is busy, for example, the rasterization order is passed on to the second parallel processor, and so on, until the order reaches a parallel processor which is not busy. The latter then executes the rasterization order.

Execution of a rasterization order, therefore, need not take place on that parallel processor where the final draw order is to be executed. Consequently, loading is distributed more evenly over the parallel processors.

In order to obtain a better distribution of the processes over the parallel processors, the raster lines can be distributed over the local bitmap memories in a different way. For example, a page usually contains margins where no image parts have to be filled, so that a parallel processor intended for that part is required to carry out practically no draw orders.

If, for example, there are ten parallel processors, the local bitmap memory of the first parallel processor may contain the raster memory lines 1, 11, 21, 31 and so on, the second parallel processor the raster memory lines 2, 12, 22, 32 and so on. Other distributions may also offer advantages depending upon the page fillings occurring most frequently in specific cases.

The above-described apparatus is very flexible in use. If larger pages have to be processed, or if higher resolving powers are required, more parallel processors can simply be added.

Figure 3:
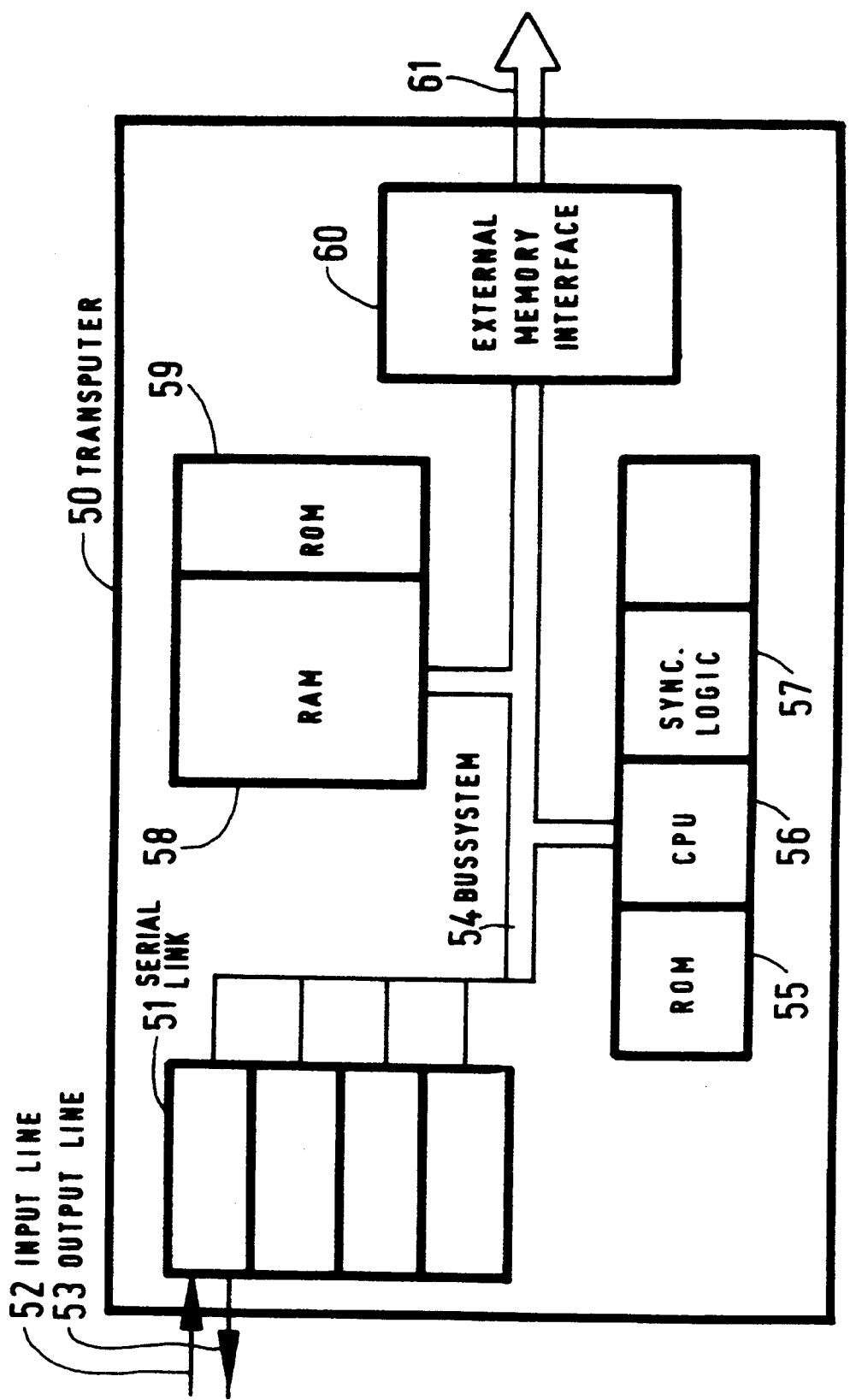
FIG. 3 is a more detailed illustration of a parallel processor according to FIG. 2.

Referring to FIG. 3, a parallel processor diagrammatically shown in more detail.

A parallel processor of the type shown is made by Messrs. Inmos Limited, Great Britain, under the name Transputer microcomputer, and comprises a processor with a memory in the form of random access memory (RAM) and also a number of serial communication connections for external communication. Transputer 50 includes CPU 56 with a read-only memory (ROM) 55 and is connected via an internal bus system 54 to an external memory interface 60, internal read and write memory 58 (RAM) and internal read-only memory 59 (ROM), and also to a number of serial communication connections 51. Transputer 50 also contains a synchronization circuit 57. Preferably, the total memory is at least 4 K bytes in size, so that CPU 56 can operate without an external memory. External memory interface 60 is connected via a number of connections 61 to a part of a page bitmap system. The Transputers can be interconnected via the serial communication connections 51 to form a network. Each serial communication connection is provided with an input line 52 and an output line 53 which jointly form the communication channel 20. The operation of a Transputer of this kind is described, for example, in European Patent Application 0 141 660.

Figure 4:
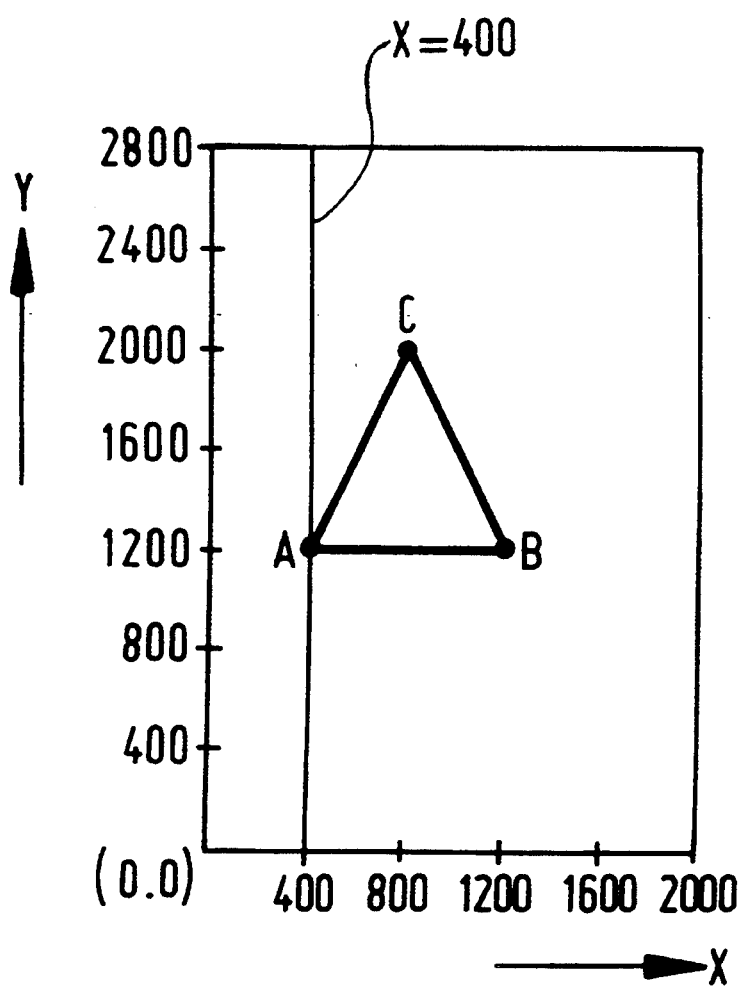
FIG. 4 is a diagram of a bitmap memory.

The method of converting and implementing the corresponding algorithm will be described with reference to an example shown in FIG. 4. FIG. 4 diagrammatically illustrates a bitmap of a full page reproduced with 2000 raster memory lines indicated on the x-axis. Each raster memory line contains 2,800 pixels (indicated on the y-axis). The four-hundredth raster memory line is indicated by x=400. In the following processes, the term "scan line" denotes the line equivalent to the raster memory line in the bitmap.

An object, e.g., triangle A B C, must be drawn in the bitmap and then completely filled. The raster memory lines of the bitmap are connected, for example, to four parallel processors (not shown), P1, P2, P3 and Processor P1 is connected to raster memory lines 0, 4, 8, 12, 16, 20 . . . , etc.

Processor P2 is connected to raster memory lines 1, 5, 9, 13, 17 . . . , etc.

Processor P3 is connected to raster memory lines 2, 6, 10, 14, 18 . . . , etc.

Processor P4 is connected to raster memory lines 3, 7, 11, 15, 19 . . . , etc.

The angle points A, B and C are represented by the coordinates in the bitmap, i.e., A (400, 1200); B (1200, 1200) and C (800, 2000).

The algorithm comprises a number of processes which will be specified hereinafter. The central unit provides the schedule process. This process distributes the object, consisting of a series of numbers, to P1, P2, P3 and P4. In the case of the triangle A B C the distribution command is as follows: fill (400, 1200) (1200, 1200) (800, 2000) (−1, −1). This command contains the angle points of the triangle to be written and also indicates that the triangle is to be filled. (−1, −1) indicates the end of the command.

Figure 5:
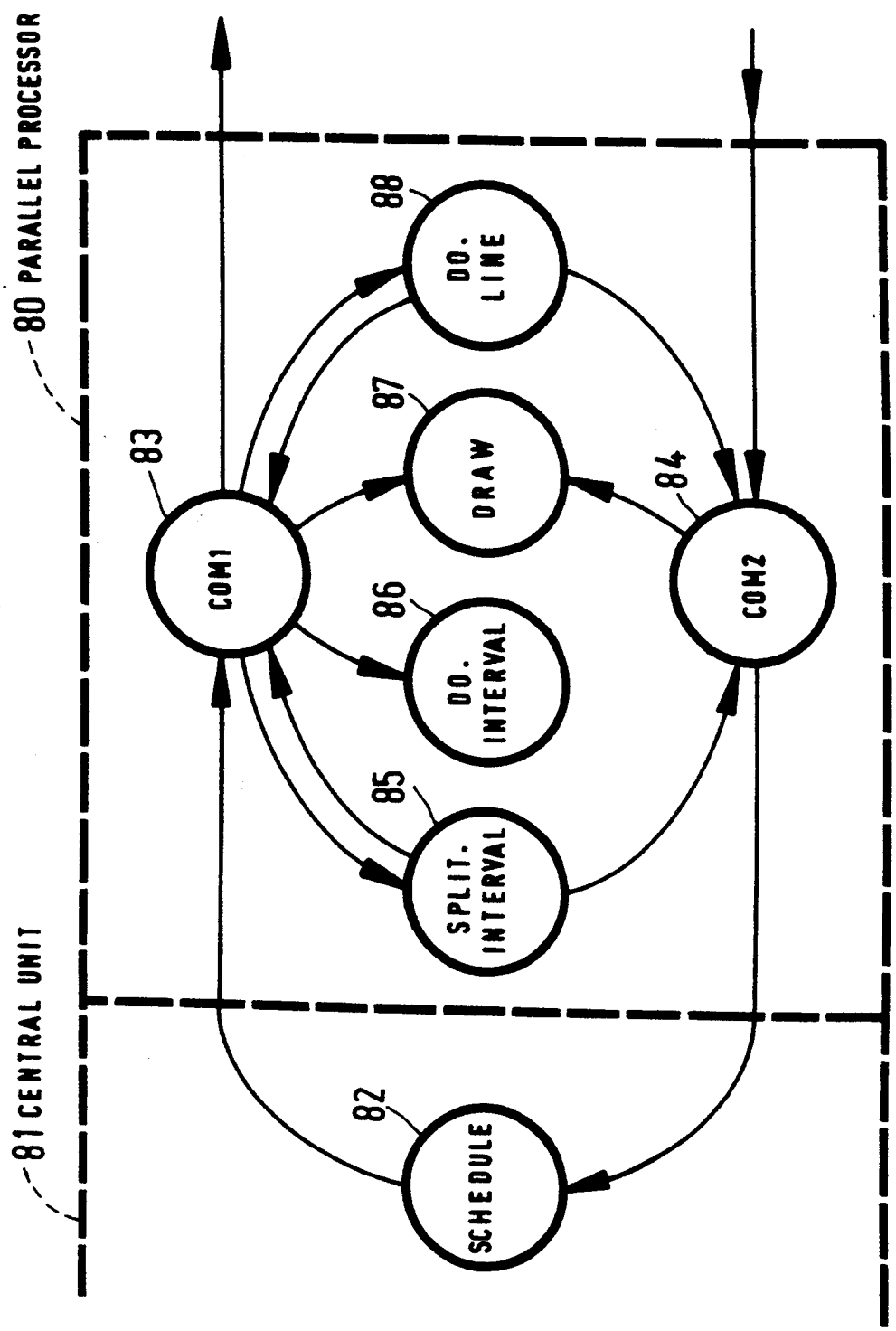
FIG. 5 is a diagram of the processes that can be performed in a parallel processor.

FIG. 5 represents the processes in parallel processor 80 in relation to the processes in central unit 81. The schedule process 82 distributes an object (originating from a file, for example) to the other processors. This object is specified by reference to angle points consisting of an x-coordinate and a y-coordinate. All the x-coordinates are sorted in a list, consecutive x-coordinates determining an interval of scan lines. Each x-coordinate also separately determines a scan line to be rasterized separately. The set of these intervals and scan lines to be rasterized separately form the orders for the other processors. These orders are transmitted to processors which are registered as "not busy" by schedule. As soon as an order has been sent to processor i it is registered as "busy". When processor i has finished its order, it sends a sign to schedule, whereafter processor i is again registered as "not busy". As long as there are orders remaining, they are sent to processors which are "not busy".

Five other processes run on the parallel processors P1 to P4:

the communication algorithm ("com1" and "com2") 83, 84,
the scan line algorithm ("do.line") 88,
the split interval algorithm ("split. interval") 85,
the draw interval algorithm ("do.interval") 86 and
the bitmap fill algorithm ("draw") 87.

The communication process com1 83 on an other processor can receive objects originating from a left-processor and store them locally and possibly pass them to a right-processor. It can pass a rasterization order originating from schedule on to the local do.line process or to the split.interval process if the order was intended for that processor, or to a right-processor. And it can pass to the local bitmap fill process draw 87 or to a right-processor a draw order originating from a left-processor, depending on the processor addressed in the draw order. It can obtain a do.interval order which is always passed both to the local do.interval 86 process and to the right-processor. It can also pass a draw order from the local do.line 88 process to a right-processor and a do.interval order from the split.interval 85 process.

The communication process com2 84 receives draw orders from right-processors and passes them to a left-processor to the local draw 87 process. Do.interval orders are passed both to the left and to the local do.interval 86 process. Signs which indicate that a specific processor is ready (originating from both a right-processor and the local do.line 88 or split.interval 85 process) are always passed to the left and finally reach schedule 82.

The do.line 88 process on another processor obtains a rasterization order for a scan line with angle points from the communication process and generates draw orders for this. These draw orders go either to the local draw 87 process or to the communication process com1 83 in order to send it to a right-processor, or to tom2 84 in order to send it to a left-processor.

The split-interval 85 process on another processor obtains a rasterization order for an interval and for this purpose generates new rasterization orders, do.interval, for the local do.interval process 86, and via com1 83 and com2 84 for the other left and right processors. A do.interval order consists of an extra set of numbers which represent indices of the object information, i.e., the starting points of the lines intersecting the associated interval. Since all the processors have the complete object, the information is unambiguously fixed herein. All the processors with one or more scan lines in the interval range can now very rapidly generate draw instructions for the local draw 87 process by using "edge coherence" (Foley).

The do.interval 86 process receives a do.interval order from the communication process com1 83 or com2 84 or from the local split.interval process 85, together with a table of indices which indicate which lines of the polygon intersect the interval, and generates therefrom draw orders solely for the local bitmap fill process.

The local draw 87 process finally replaces in the bitmap memory a part which corresponds to that part of the scan line as is specified in the draw order.

With reference to FIG. 4, the algorithm is as follows:

1. Input for schedule: fill (400, 1200) (1200, 1200) (800, 2000) (−1, −1).

2. Schedule reads the object and copies the description to subprocessors P1 to P4. While the object is being copied, schedule sorts and splits the object into a number of parts, in this case:

R1 scan line x=400
R2 interval x=401, 799
R3 scan line x=800
R4 interval x=801, 1199
R5 scan line x=1200.

R1 to R5 are the orders that schedule passes to the subprocessors.

3. Schedule transmits orders Ri (i.e., any of the orders R1 to R5) as long as there are processors which are not executing any orders or until the orders are completed. Assuming that order R1 reaches P1, R2 reaches P2, R3 reaches P3, and R4 reaches P4, R5 cannot yet be sent (all the processors are busy with an order). The four processors can work out simultaneously for each part what ones should be filled. This results in draw orders.

4. P1 produces the draw order D400, 1200, 1200 (fill in scan line 400, pixels 1200 to 1200). Since scan line 400 falls in bitmap P1, it is processed internally. P2 produces successively D401,1200,1202 and this order is executed on P2; D402,1200,1204 is sent by P2, and received and executed by P3; D403,1200,1206 is also sent and reaches P3, is passed on and reaches P4 where it is executed, and so on. At the same time P3 produces D800,1200,1200 which is finally executed at P1. P1 and P3 should now be ready so that one of these can execute R5. P4 simultaneously produces D801,1200,1998 which is sent to P2 and D802,1200,1996 which is sent to P3 and so on.

Whenever a processor has completed an Ri, schedule is informed thereof. When all the Ri have been executed, the next object can be read, copied and rasterized. All the objects occurring can correspondingly be rapidly generated in a bitmap memory.

While presently preferred embodiments have been described and shown, the invention may be otherwise embodied within the scope of the appended claims.

What is claimed is:

1. A method of converting object data concerning the outline of image parts or objects to raster data using at least two parallel processors each having a local bitmap memory subdivided into raster memory lines for storing scan lines that make up a raster, a central unit and a communication channel said method comprising:

defining a number of angle points for each object to define said object data concerning the outline of each object;

generating a rasterization order with said central unit for at least one part of said object data;

transmitting said rasterization order to a parallel processor determined first in time to be not busy;

executing said rasterization order by said parallel processor determined first to be not busy, and generating at least one corresponding draw order, said draw order including data as to a position in said bitmap memory where a result of said draw order is to be stored; and executing said draw order in a predetermined parallel processor, said local bitmap memory of said predetermined parallel processor being filled with raster data concerning at least the one part of said object data.

2. A method according to claim 1, including the generation of a rasterization order for each angle point of object and for intervals situated between two angle points.

3. A method according to claim 2, including the sorting of the angle points into a sequence corresponding to their position perpendicular to the scan lines.

4. Apparatus for converting data concerning the outlines of image parts or objects to raster data, a raster being built up from a number of scan lines, comprising:

a. a central unit adapted to generate and transmit a rasterization order for at least part of the object, b. at least two parallel processors, each of said processors having a communication unit, a local bitmap memory subdivided into raster memory lines in which corresponding scan lines can be stored and an arithmetic logic unit which generates on the basis of the rasterization order, a corresponding draw order with data concerning a position in said bitmap memory where a result of said draw order is to be stored, and to store this result in the local bitmap memory, c. said communication unit including means for transmitting said rasterization order to a nonbusy other processor if said arithmetic logic unit is busy, each communication unit of said processor further comprising comparison means for comparing location data in a draw order with data of the position of the raster lines in the local bitmap memory and for feeding the draw order to said arithmetic logic unit upon agreement of the location data in the draw order with data of the position of the raster lines in the local bit memory, and d. a communication channel interconnecting said central unit and said parallel processors for transmitting data, including said raster order from a busy to a nonbusy processor.

5. Apparatus according to claim 4, wherein each local bitmap memory comprises a number of raster memory lines, the raster memory lines being adapted to receive a number of scan lines which are distributed non-contiguously over the image.

* * * * *